(12) United States Patent
Liao

(10) Patent No.: US 9,091,838 B2
(45) Date of Patent: Jul. 28, 2015

(54) THIN-TYPE WIDE-ANGLE IMAGING LENS ASSEMBLY WITH FIVE LENSES

(71) Applicant: Ability Opto-Electronics Technology Co., Ltd., Taichung County (TW)

(72) Inventor: Kuo-yu Liao, Taichung (TW)

(73) Assignee: ABILITY OPTO-ELECTRONICS TECHNOLOGY CO., LTD., Taichung County (TW)

( * ) Notice: Subject to any disclaimer, the term of this patent is extended or adjusted under 35 U.S.C. 154(b) by 43 days.

(21) Appl. No.: 14/053,125

(22) Filed: Oct. 14, 2013

(65) Prior Publication Data
US 2014/0313595 A1    Oct. 23, 2014

(30) Foreign Application Priority Data

Apr. 22, 2013  (TW) .............................. 102207276 U

(51) Int. Cl.
*G02B 9/60*     (2006.01)
*G02B 13/00*    (2006.01)

(52) U.S. Cl.
CPC .............. *G02B 13/0045* (2013.01); *G02B 9/60* (2013.01)

(58) Field of Classification Search
CPC .............. G02B 9/00; G02B 9/60; G02B 9/62; G02B 9/64; G02B 13/0045
USPC ......... 359/708, 713, 714, 754–757, 759, 763, 359/764, 767
See application file for complete search history.

(56) References Cited

U.S. PATENT DOCUMENTS

2013/0265650 A1*  10/2013  Chen et al. .................... 359/714

* cited by examiner

*Primary Examiner* — Darryl J Collins
(74) *Attorney, Agent, or Firm* — Ming Chow; Sinorica, LLC

(57) ABSTRACT

A thin-type wide-angle imaging lens assembly comprises a fixing diaphragm and an optical set including five lenses. An arranging order from an object side to an image side is: a first lens; a second lens; a third lens; a fourth lens; a fifth lens; and the fixing diaphragm disposed between an object and the third lens. At least one surface of the first, second, and third lenses is aspheric. At least one surface of the fourth and fifth lenses is aspheric. By the concatenation between the lenses and the adapted curvature radius, thickness, interval, refractivity, and Abbe numbers, the assembly attains a shorter height and a better optical aberration.

1 Claim, 4 Drawing Sheets

THIN-TYPE WIDE-ANGLE IMAGING LENS ASSEMBLY WITH FIVE LENSES

The current application claims a foreign priority to the patent application of Taiwan No. 102207276 filed on Apr. 22, 2013.

BACKGROUND OF THE INVENTION

1. Field of the Invention

The present invention relates to a thin-type wide-angle imaging lens assembly with five lenses, in particular to a lens structure attaining a shorter height and a high resolution by curvature, interval and optical parameter between each lens.

2. Description of the Related Art

The conventional lens structure adopts an image display lens assembly which is applied to smart phone, tablet PC, cell phone, notebook, and webcam. The electronic products are developed to become lighter, thinner, shorter, and smaller and provide with higher efficiency. A video sensor of the image display lens assembly, such as Charge Coupled Device (CCD) or Complementary Metal Oxide Semiconductor (CMOS), is also developed for more pixels, so the lens structure is ceaselessly developed to be provided with compactness and higher resolution.

Therefore, the present invention is disclosed in accordance with a lens structure with multi-lens for a demand of the development of the image display lens assembly, especially to an imaging lens assembly of a lens structure with at least five lenses.

SUMMARY OF THE INVENTION

In view of the conventional lens structure that has big volume and lack of efficiency, a thin-type wide-angle imaging lens assembly with five lenses is disclosed.

It is an object of the present invention to provide a thin-type wide-angle imaging lens assembly with five lenses, which comprises a fixing diaphragm and an optical set. The optical set includes a first lens, a second lens, a third lens, a fourth lens, and a fifth lens, an arranging order thereof from an object side to an image side is: the first lens with a positive refractive power defined near an optical axis and a concave surface directed toward the image side, and at least one surface of the first lens is aspheric; the second lens with a positive refractive power defined near the optical axis and a convex surface directed toward the image side, and at least one surface of the second lens is aspheric; the third lens having a lens with a negative refractive power defined near the optical axis and a concave surface directed toward the object side, and at least one surface of the third lens is aspheric; the fourth lens with a positive refractive power defined near the optical axis, a concave surface directed toward the object side and disposed near the optical axis, and a convex surface directed toward the image side and disposed near the optical axis, and at least one surface of the fourth lens is aspheric; the fifth lens having a convex surface with a corrugated contour directed toward the object side and disposed near the optical axis, and a concave surface with a corrugated contour directed toward the image side and disposed near the optical axis, and at least one surface of the fifth lens are aspheric; and the fixing diaphragm disposed between an object and the third lens.

The imaging lens assembly satisfies the following conditional expression: $0.3 < f/TL < 0.8$. The TL is defined as a distance from a top point of the object side of first lens to an imaging surface side. The f is a focal length of the entire assembly.

The imaging lens assembly satisfies the following conditional expression: $0.7 < TL/Dg < 1.3$. The TL is defined as the distance from a top point of the object side of the first lens to the imaging surface side. The Dg is defined as a length diagonal of a maximum using visual angle of the lens assembly imaged on said imaging surface.

A shape of the aspheric surface of the imaging lens assembly satisfies a formula of:

$$z = \frac{ch^2}{1 + [1 - (k+1)c^2h^2]^{0.5}} + Ah^4 + Bh^6 + Ch^8 + Dh^{10} + Eh^{12} + Fh^{14} + Gh^{16} + Hh^{18} + Jh^{20} + \ldots$$

The z is defined as a position value about a location at a height of h along a direction of the optical axis referring to a surface top point. The k is defined as a conic constant. The c is defined as a radius of a curvature. The A, B, C, D, E, F, G, etc. are defined as high-order aspheric surface coefficients.

The present invention is characterized in that a lens structure attains a shorter height and a high resolution by curvature, interval, and optical parameter between each lens.

DETAILED DESCRIPTION OF THE PREFERRED EMBODIMENTS

Figure 1:
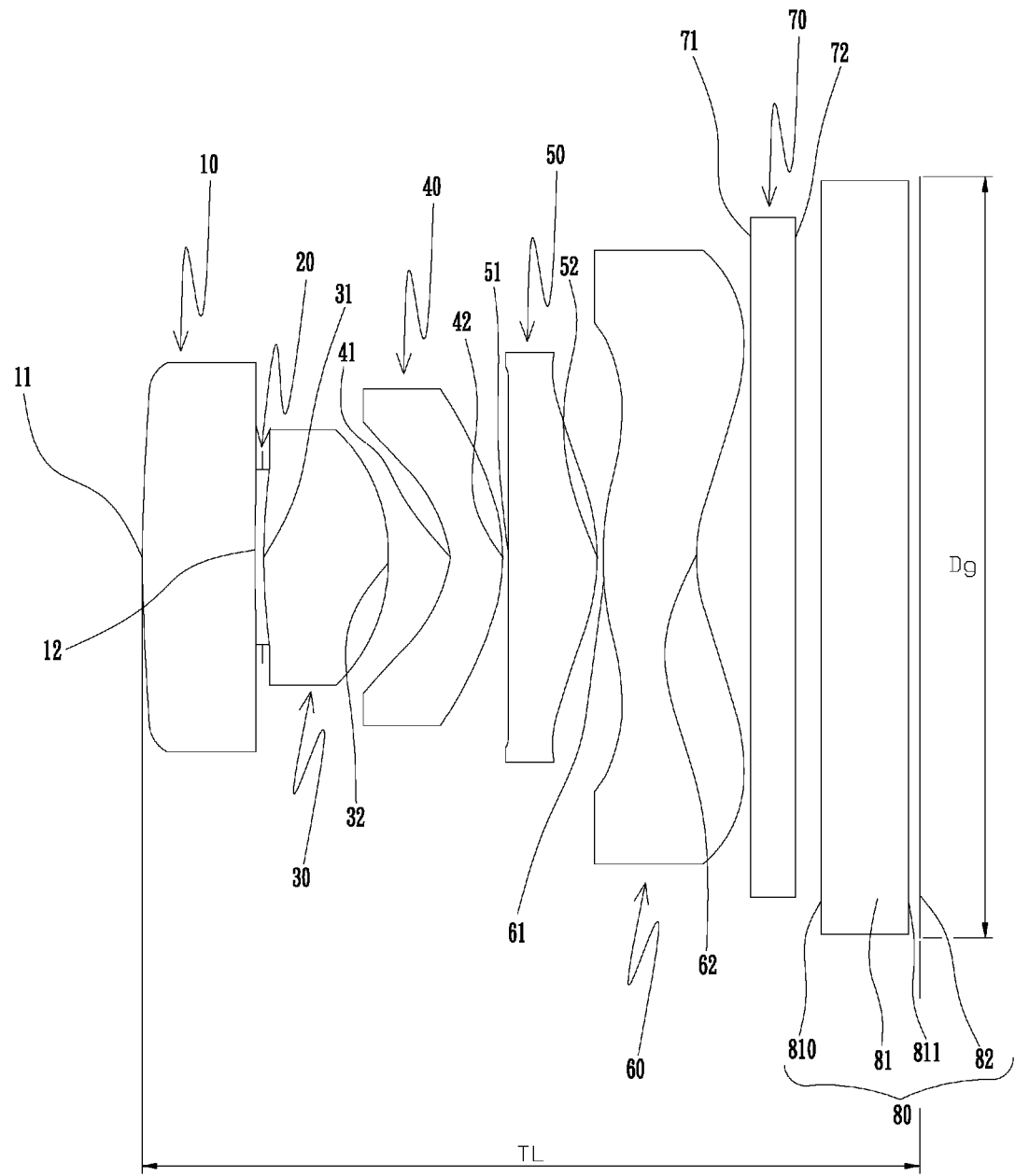
FIG. 1 is a schematic view showing an optical structure of a preferred embodiment of the present invention.

Before describing in detail, it should note that the like elements are denoted by the similar reference numerals throughout disclosure.

The present invention provides an imaging lens structure, in particular to a lens structure attaining a shorter height and a high resolution by a curvature, an interval, and an optical parameter between each lens.

Referring to FIG. 1, a schematic view of an optical structure of a thin-type wide-angle imaging lens assembly with five lenses is shown. The structure of the imaging lens comprises a fixing diaphragm 20 and an optical set. The optical set includes a first lens 10, a second lens 30, a third lens 40, a fourth lens 50, and a fifth lens 60, an arranging order thereof from an object side to an image side is: the first lens 10 with a positive refractive power defined near an optical axis and a concave surface directed toward the image side, and at least one surface of the first lens 10 is aspheric; the second lens 30 with a positive refractive power defined near the optical axis and a convex surface directed toward the image side, and at least one surface of the second lens 30 is aspheric; the third lens 40 having a lens with a negative refractive power defined near the optical axis and a concave surface directed toward the object side, and at least one surface of the third lens 40 is aspheric; the fourth lens 50 with a positive refractive power defined near the optical axis, a concave surface directed toward the object side and disposed near the optical axis, and a convex surface directed toward the image side and disposed near the optical axis, and at least one surface of the fourth lens 50 is aspheric; the fifth lens 60 having a convex surface with a corrugated contour directed toward the object side and disposed near the optical axis and a concave surface with a corrugated contour directed toward the image side and disposed near the optical axis, and at least one surface of the fifth lens 60 is aspheric; the fixing diaphragm 20 is disposed between an object and the third lens 40; a filter unit 70 filtering light with specific wave length, which is adopted by an infrared stopping filter unit and used for a visible light image, or a visible light stopping filter unit used for filtering the visible light, a wave length of the light passing therethrough being 780~1050 mm and being applied to an infrared light image of an invisible light; and an image sensor 80 (an imaging surface side) used for receiving a digital signal transformed by an infrared invisible light image of the filter unit. The image sensor 80 includes a flat protection lens 81 and a video sensor 82. The video sensor 82 is preferably adopted by Charge Coupled Device (CCD) or Complementary Metal Oxide Semiconductor (CMOS).

The imaging lens assembly satisfies the following conditional expression: 0.3<f/TL<0.8. The TL is defined as distance from a top point of the object side of the first lens to the imaging surface side. The f is defined as a focal length of the entire lens assembly.

The imaging lens assembly satisfies the following conditional expression: 0.7<TL/Dg<1.3. The TL is defined as the distance from the top point of the object side of the first lens to the imaging surface side. The Dg is defined as a length diagonal of a maximum using visual angle of the lens assembly imaged on said imaging surface.

The first lens 10 includes a first surface 11 facing an object side and a second surface 12 facing the imaging surface side. The first surface 11 is defined as a convex surface disposed near the optical axis opposite to the object side. The second surface 12 is defined as a concave surface disposed near the optical axis opposite to the imaging surface side. The second lens 30 includes a third surface 31 facing the object side and a fourth surface 32 facing the imaging surface side. The third surface 31 is defined as a convex surface disposed near the optical axis opposite to the object side. The fourth surface 32 is defined as a convex surface disposed near the optical axis opposite to the imaging surface side. The third lens 40 includes a fifth surface 41 facing the object side and a sixth surface 42 facing the imaging surface side. The fifth surface 41 is defined as a concave surface disposed near the optical axis opposite to the object side. The sixth surface 42 is defined as a convex surface disposed near the optical axis opposite to the imaging surface side. The fourth lens 50 includes a seventh surface 51 facing the object side and a eighth surface 52 facing the imaging surface side. The seventh surface 51 is defined as a concave surface disposed near the optical axis opposite to the object side. The eighth surface 52 is defined as a convex surface disposed near the optical axis opposite to the imaging surface side. The fifth lens 60 includes a ninth surface 61 facing the object side and a tenth surface 62 facing the imaging surface side. The ninth surface 61 is defined as a convex surface disposed near the optical axis opposite to the object side. The tenth surface 62 is defined as a concave surface disposed near the optical axis opposite to the imaging surface side. At least one surface of the first lens 10, the second lens 30, and the third lens 40 is aspheric, and at least one surface of the fourth lens 50 and the fifth lens 60 is aspheric, thereby correcting the spherical aberration and the image aberration for being provided with a characteristic of low tolerance sensitivity.

A shape of the aspheric surface of the imaging lens assembly satisfies a formula of:

$$z = \frac{ch^2}{1+[1-(k+1)c^2h^2]^{0.5}} + Ah^4 + Bh^6 +$$
$$Ch^8 + Dh^{10} + Eh^{12} + Fh^{14} + Gh^{16} + Hh^{18} + Jh^{20} + ...$$

The z is defined as a position value about a location at a height of h along a direction of the optical axis referring to a surface top point. The k is defined as a conic constant. The c is defined as a reciprocal of a radius of a curvature. The A, B, C, D, E, F, G, etc. are defined as high-order aspheric surface coefficients.

In an ultra-wide-angle micro-optical image capturing device of the present invention, the fixing diaphragm 20 is disposed between the object and the third lens 40 for getting an incident beam. The first lens 10, the second lens 30, and the fourth lens 50 are adopted by lenses with positive refractive power defined near the optical axis, and the third lens 40 is adopted by a lens with negative refractive power defined near the optical axis. The first lens 10 adopts the first surface 11 convexly defined toward the object side and disposed near the optical axis for assembling the external incident beam with ultra-wide-angle so as to keep the beam on the second surface 12 of the first lens 10, thereby presenting a function of the aspheric surface, correcting the aberration, reducing the tolerance sensitivity, and rendering the device have ultra-wide-angle with an image-capture angle over 85°. The third surface 31 defined on the second lens 30 as a convex surface disposed near the optical axis opposite to the object side is then expanded. The fourth surface 32 is defined as a lens with positive refractive power defined near the optical axis and a convex surface opposite to the imaging surface side. The fifth lens 60 radiates via the ninth surface 61 disposed near the optical axis and concavely defined toward the imaging surface side, so that the beam is able to be spread on the tenth surface 62 with a larger dimension. That is to say, the incident beam is expanded by the third surface 31 for being spread on the tenth surface 62 with a larger dimension.

The aspheric surface not only corrects the spherical aberration and the image aberration but also reduces the full length of the lens optical system. The first lens 10, the second lens 30, the third lens 40, the fourth lens 50, and the fifth lens 60 are preferably adopted by plastic, which is conducive to eliminate the aberration and reduce the weight of the lens. The entire optical system consists of five plastic lenses and benefits a mass production. The system also provides with the low tolerance sensitivity and a large depth of field and attains an assembly tolerance less than a usable scope of a depth of focus of an optical focusing. Accordingly, the optical system does not need to focus in practice. The optical system is also easy to be manufactured and assembled to meet the requirement of mass production.

By the concatenation between the above-mentioned surfaces of lenses and the adapted curvature radius, thickness, interval, refractivity, and Abbe numbers, the assembly attains a shorter height and a better optical aberration.

Due to the above-mentioned technique of the present invention, it is able to be practiced in accordance with the following values:

Basic lens data of the preferred embodiment

| Surfaces | | Curvature radius (Radius) | Thickness/ Interval (Thickness) | Refractivity (Nd) | Abbe number (Vd) |
|---|---|---|---|---|---|
| First lens 10 | First surface 11 | 4.93 | 0.52 | 1.544100 | 56.093602 |
| | Second surface 12 | 5.24 | 0.04 | | |
| Fixing diaphragm 20 | | ∞ | 0.01 | | |
| Second lens 30 | Third surface 31 | 2.14 | 0.57 | 1.544100 | 56.093602 |
| | Fourth surface 32 | −0.98 | 0.28 | | |
| Third lens 40 | Fifth surface 41 | −0.38 | 0.25 | 1.63550 | 23.891420 |
| | Sixth surface 42 | −0.80 | 0.03 | | |
| Fourth lens 50 | Seventh surface 51 | −7.18 | 0.40 | 1.534611 | 56.072163 |
| | Eighth surface 52 | −0.95 | 0.03 | | |
| Fifth lens 60 | Ninth surface 61 | 1.22 | 0.43 | 1.534611 | 56.072163 |
| | Tenth surface 62 | 0.83 | 0.24 | | |
| Filter unit 70 | Eleventh surface 71 | ∞ | 0.21 | 1.516800 | 64.167336 |
| | Twelfth surface 72 | ∞ | 0.12 | | |
| Flat protection lens 81 | Thirteenth surface 810 | ∞ | 0.40 | 1.516800 | 64.167336 |
| | Fourteenth surface 811 | ∞ | 0.05 | | |

The filter unit 70 has a thickness of 0.21 mm. A thickness of the flat protection lens 51 is 0.4 mm.

The values of quadratic surface coefficient of the aspheric surface of the preferred embodiment are listed as follows:

The first surface 11 (k=−66.67):
A: −0.011018
B: −0.013406
C: −0.057920
D: −0.195842
E: 0.120786
F: 0.356078
G: 0.221594

The second surface 12 (k=−139.31)
A: −0.068843
B: −0.240820
C: −0.167434
D: 0.604409
E: 12.533101
F: −10.704473
G: 713.2325

The third surface 31 (k=−131.33)
A: 1.041994
B: −10.519777
C: 26.351436
D: 200.61461
E: −1829.0086
F: 4103.7497
G: 0

The fourth surface 32 (k=−1.18)
A: −0.499085
B: 0.322910
C: −1.706613
D: −6.403224
E: 8.347122
F: 38.266805
G: 0

The fifth surface 41 (k=−0.84)
A: 0.901708
B: 1.872703
C: −4.402454
D: −23.256387
E: 126.01697
F: −139.54582
G: 0

The sixth surface 42 (k=−0.77)
A: 0.525452
B: −0.170326
C: −1.248814
D: 1.556535
E: 1.395093
F: −2.124609
G: 0

The seventh surface 51 (k=−190.86)
A: 0.307895
B: −0.507978
C: 0.243122
D: −0.340431
E: 0.936497
F: −0.716260
G: 0

The eighth surface 52 (k=−1.34)
A: 0.194922
B: 0.525207
C: −0.959551
D: 0.398880
E: 0.511625
F: −0.375928
G: 0

The ninth surface 61 (k=−7.44)
A: −0.083541
B: −0.617236
C: 0.828080
D: −0.302370
E: −0.200342
F: 0.163200
G: −0.021798

The tenth surface 62 (k=−0.71)
A: −0.717229
B: 0.365261
C: −0.103800
D: −0.008163
E: −0.006292
F: 0.011075
G: −0.003042

According to the above-mentioned values, the related exponent of performance of the micro-image capturing lens is: f=1.87 mm; TL=3.59 mm; f/TL=0.52; Dg=3.50 mm; TL/Dg=1.03.

Figure 2:
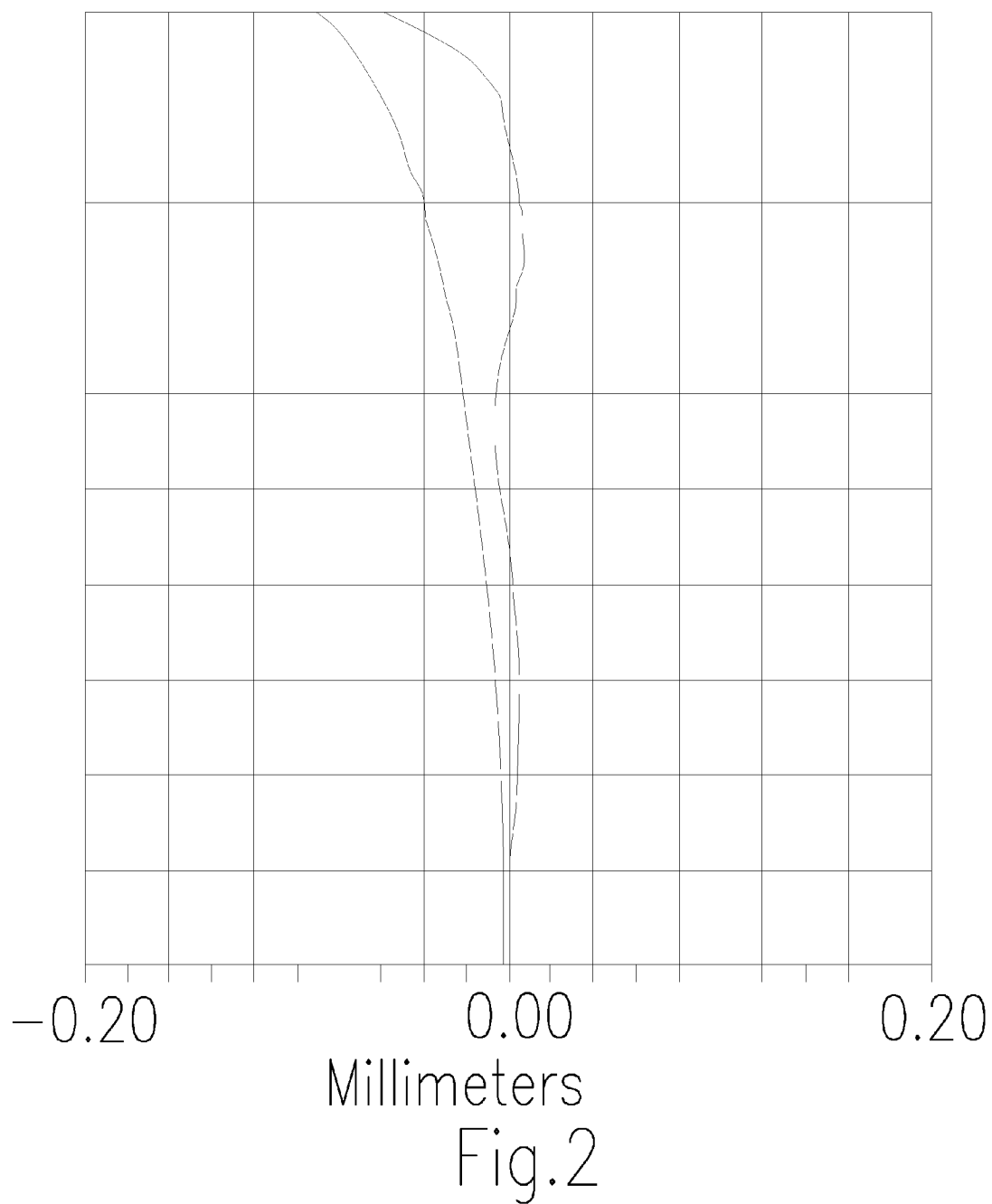
FIG. 2 is a schematic view showing an astigmatic aberration of the preferred embodiment of the present invention.
Figure 3:
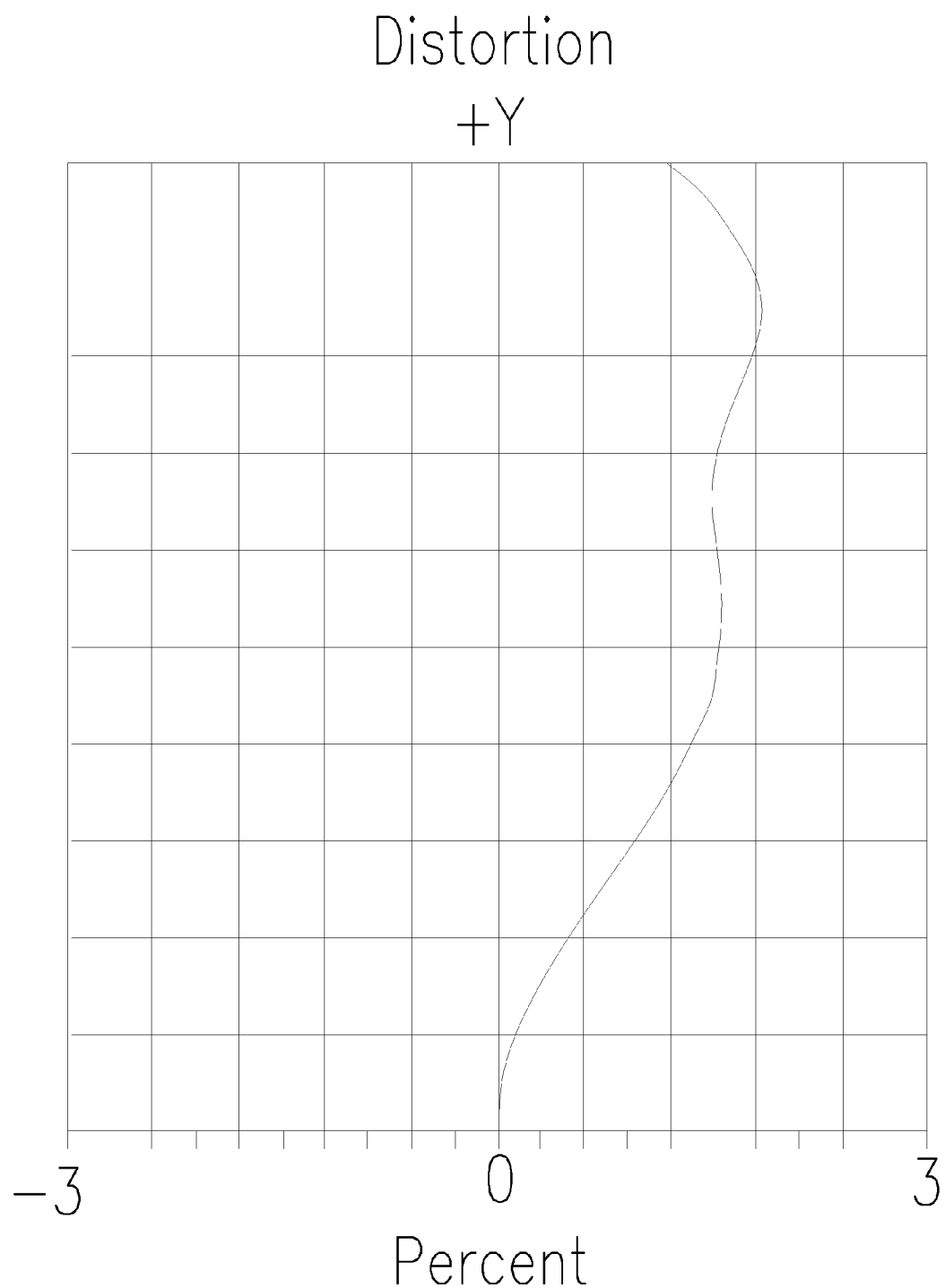
FIG. 3 is a schematic view showing a distorted aberration of the preferred embodiment of the present invention.
Figure 4:
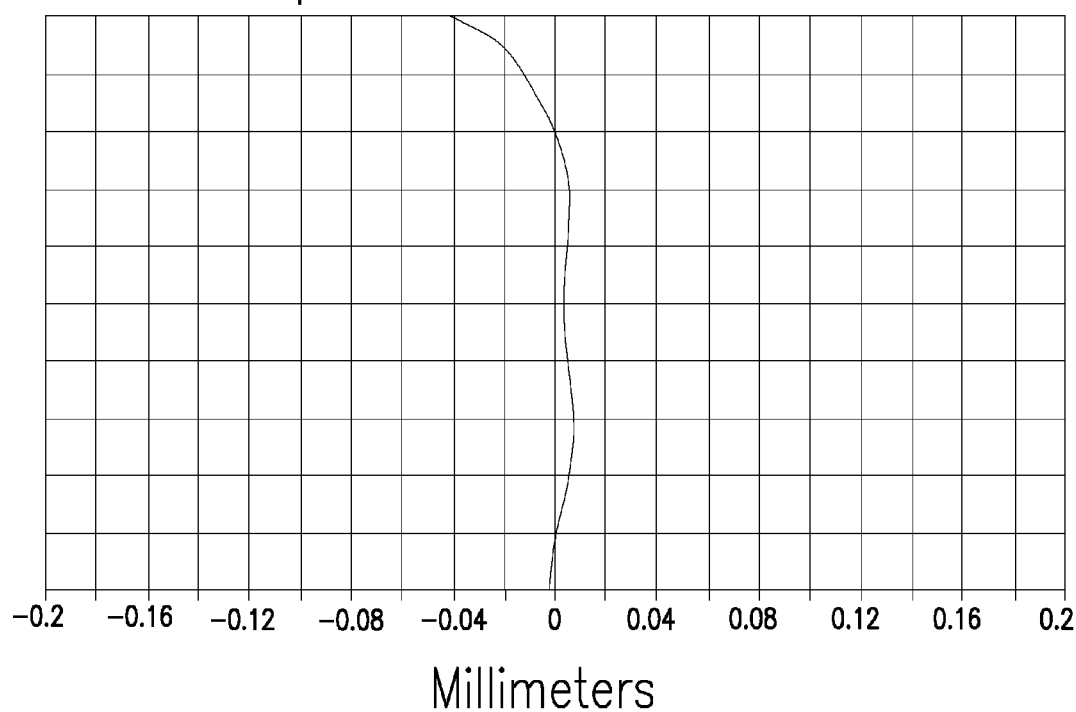
FIG. 4 is a schematic view showing a spherical aberration of the preferred embodiment of the present invention.

Referring to FIG. 2, a schematic view of an astigmatic aberration of the preferred embodiment of the present invention is shown. Referring to FIG. 3, a schematic view of a distorted aberration of the preferred embodiment of the present invention is shown. Referring to FIG. 4, a schematic view of a spherical aberration of the preferred embodiment of the present invention is shown. The measured astigmatic aberration, distorted aberration, and spherical aberration are in the standard scope and have a good optical performance and imaging quality according to the above-mentioned figures. Further, the depth of field of the device is large enough and the assembly tolerance is less than the usable scope of a depth of focus of an optical focusing. Accordingly, the device does not need to focus in practice. By contrast, the device of the present invention is easier to be manufactured and assembled and meets the requirement of mass production.

The micro-optical image capturing device utilizes five aspheric lenses, the front four lens of which have refractive power defined near the optical axis sequentially arranged as positive, positive, negative, and positive, and the filter unit 70 which filters a light with specific wave length and allows the light with the required wave length. The filter unit 70 is preferably adopted by an infrared stopping filter unit used for the visible light image or a visible light stopping filter used for the infrared light image of the invisible light.

By making use of the aspheric surface that corrects the aberration and reduces the tolerance sensitivity, not only the aberration is corrected but also the full length of the lens optical system is reduced. Further, the device provides with a ultra-wide-angle with an image capturing angle over 85°. The first, second, third, fourth, and fifth lenses are preferably adopted by plastic, which is conducive to eliminate the aberration and reduce the weight of the lens. The optical system consists of five plastic lenses and benefits a mass production. The optical system also provides with the low tolerance sensitivity and a fine imaging quality. The optical system is also easy to be manufactured and assembled to meet the requirement of mass production.

While we have shown and described the embodiment in accordance with the present invention, it should be clear to those skilled in the art that further embodiments may be made without departing from the scope of the present invention.

I claim:

1. A thin-type wide-angle imaging lens assembly with five lenses comprising a fixing diaphragm and an optical set; said optical set including a first lens, a second lens, a third lens, a fourth lens, and a fifth lens, an arranging order thereof from an object side to an image side being:

said first lens having a positive refractive power defined near an optical axis and a concave surface directed toward said image side; at least one surface of said first lens being aspheric;

said second lens having a positive refractive power defined near the optical axis and a convex surface directed toward said image side; at least one surface of said second lens being aspheric;

said third lens having a lens with a negative refractive power defined near the optical axis and a concave surface directed toward said object side; at least one surface of said third lens being aspheric;

said fourth lens having a positive refractive power defined near the optical axis, a concave surface directed toward said object side and disposed near said optical axis, and a convex surface directed toward said image side and disposed near said optical axis; at least one surface of said fourth lens being aspheric;

said fifth lens having a convex surface with a corrugated contour directed toward said object side and disposed near said optical axis, and a concave surface with a corrugated contour directed toward said image side and disposed near said optical axis; at least one surface of said fifth lens being aspheric;

said fixing diaphragm being disposed between an object and said third lens;

said thin-type wide-angle imaging lens assembly with five lenses satisfying the following conditional expression: $0.3<f/TL<0.8$, wherein said TL is defined as a distance from object side surface of said first lens to the image plane on the optical axis, said f is a focal length of said entire assembly, and $0.7<TL/Dg<1.3$, wherein said Dg is defined as a length diagonal of a maximum using visual angle of said lens assembly imaged on said imaging plane.

* * * * *